Jan. 10, 1939. H. G. KAMRATH 2,143,350
COMBINATION AIR CLEANER AND SILENCER
Filed Nov. 20, 1935 2 Sheets-Sheet 1

Inventor
Herbert G. Kamrath

By Blackmore, Spencer & Flint
Attorneys

Jan. 10, 1939.   H. G. KAMRATH   2,143,350
COMBINATION AIR CLEANER AND SILENCER
Filed Nov. 20, 1935   2 Sheets—Sheet 2

Inventor
Herbert G. Kamrath
By Blackmore, Spencer & Flint
Attorneys

Patented Jan. 10, 1939

2,143,350

UNITED STATES PATENT OFFICE 2,143,350

COMBINATION AIR CLEANER AND SILENCER

Herbert G. Kamrath, Flint, Mich., assignor to General Motors Corporation, Detroit, Mich., a corporation of Delaware Application November 20, 1935, Serial No. 50,746

8 Claims. (Cl. 183—49)

This invention relates to air cleaner and silencer assemblies of the type shown in Figure 5 of my application Serial No. 41,999, filed September 25, 1935, wherein an oil bath type air cleaner is seated on and supported from a resonator silencer. The principal objects of this invention are to improve the air cleaner and silencer assembly shown in my prior application in the matters of compactness, appearance and means for supporting the air cleaner element from the silencer element and to render the assembly easier and cheaper to manufacture.

For a better understanding of the nature and objects of this invention reference is made to the following specification wherein there are described the preferred embodiments of the invention which are illustrated in the accompanying drawings.

Figure 1:
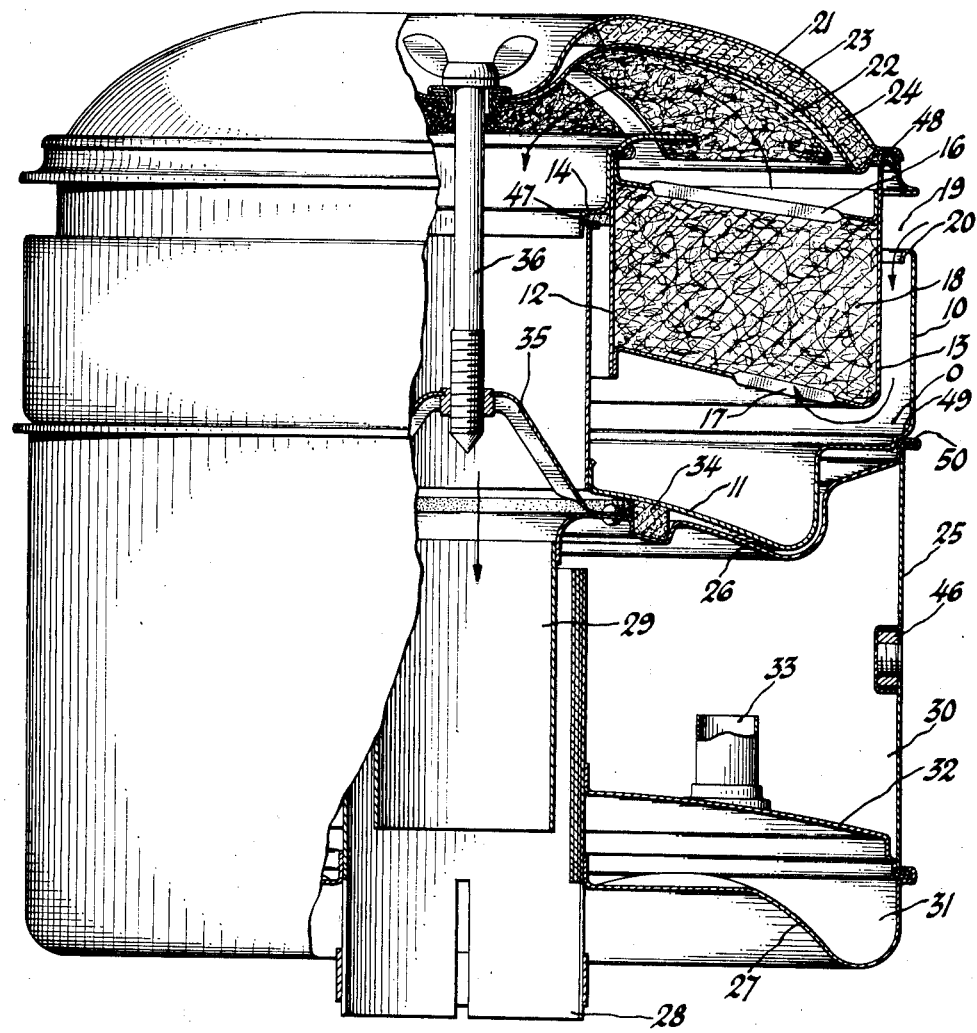
Figure 1 shows, partly in elevation and partly in section, an air cleaner and silencer assembly in which my invention is embodied.

The air cleaner element of the assembly shown in Figure 1 is of the type disclosed in the Blair application Serial No. 50,755 filed November 20, 1935, and includes a cup-like member 10 with a stepped convex bottom 11 and a tube 12 which extends through a central opening in and is secured to the bottom 11 so that it forms with the cup-like member an annular receptacle which is filled with oil up to about the level 0 before the cleaner is put into use. Within the upper end of the cup-like member 10, there is located an annular filter element 13 which is supported from the tube 12 through an annular element 14 and a compressible gasket 47. The filter element 13 consists of a receptacular body which has openings 16 and 17 in its upper and lower walls and is filled with a suitable filtering medium 18. The filter element is somewhat smaller in diameter than the cup-like member 10 and its outer wall extends upwardly beyond the outer wall of the cup-like member and provides with it an air intake opening 19. To prevent oil splashing out through the space between the outer walls of the cup-like member and the filter element, there is provided on the upper end of the outer wall of the cup-like member an inturned flange 20.

The upper ends of the filter element 13 and the tube 12 are closed to the atmosphere by a cover 21 which is supported on the outer wall of the filter element through a compressible gasket 48 and is so shaped as to permit the passage of air from the filter element to the tube during operation of the cleaner. As shown in the drawing, the cover 21 consists of an imperforate sheet metal element 23, a pad 24 of sound absorbing material which constitutes a lining for the element 23 and a spider-like sheet metal retainer 22 for the pad 24 secured at its center and near its outer edge to the element 23.

The silencer element of the assembly shown in Figure 1 includes a cylindrical wall 25 and upper and lower walls 26 and 27 which are suitably connected to the wall 25. Through the center of the cylindrical element formed by the walls 25, 26 and 27, there extends a duct which consists of telescopically related tubes 28 and 29. The tube 28 extends through an opening in and is secured to the lower wall 27 and its upper end terminates short of but near the upper wall 26. The tube 29 extends through an opening in and is secured to the upper wall 26. It is coaxial with and of smaller diameter than the tube 28 and projects into the latter to a point somewhat above the level of the lower wall 27. The compartment defined by the duct 28—29 and the walls 25, 26 and 27 is divided into two chambers 30 and 31 by a partition 32 through which extends a tube 33.

For the sake of appearance, the air cleaner and silencer elements are preferably made of the same diameter. So that they can be assembled into a compact unit, the upper wall of the silencer element is made concave and of the same general contour as the bottom wall of the air cleaner element. As shown in the drawings, the air cleaner and silencer elements are assembled with the bottom of the air cleaner element seated on a compressible gasket 34 which is located in an annular channel in the top wall of the silencer element near its axis. Coaxiality of the air cleaner and silencer elements is insured and relative lateral shifting thereof prevented by telescoping of the "riser" of the upper step 49 of the bottom of the former within the "riser" of the upper step 50 of the upper wall of the latter. The air cleaner and silencer elements are secured together and the cover 21, the filter element 13 and the body 10—12 of the air cleaner element are held in assembled relation by a yoke 35 which is secured to the upper wall of the silencer element and a wing screw 36 which bears on the outer surface of the cover 21.

When the air cleaner and silencer elements have been assembled in the manner described, the wing screw 36 should be tightened sufficiently to draw the upper step 49 of the bottom of the air cleaner element into contact with the upper step 50 of the upper wall of the silencer element. This action will compress the gasket 34 sufficiently that it will effectively prevent leakage of air into the duct 28—29 between the air cleaner and silencer elements and will give the air cleaner element a "two-point" bearing on the silencer element. It is, however, to be noted that the juxtaposed walls of the air cleaner and silencer elements are so shaped that even after the wing screw 36 has been tightened to the extent described, they will not be in contact at any point between their peripheries and the gasket 34.

Figure 2:
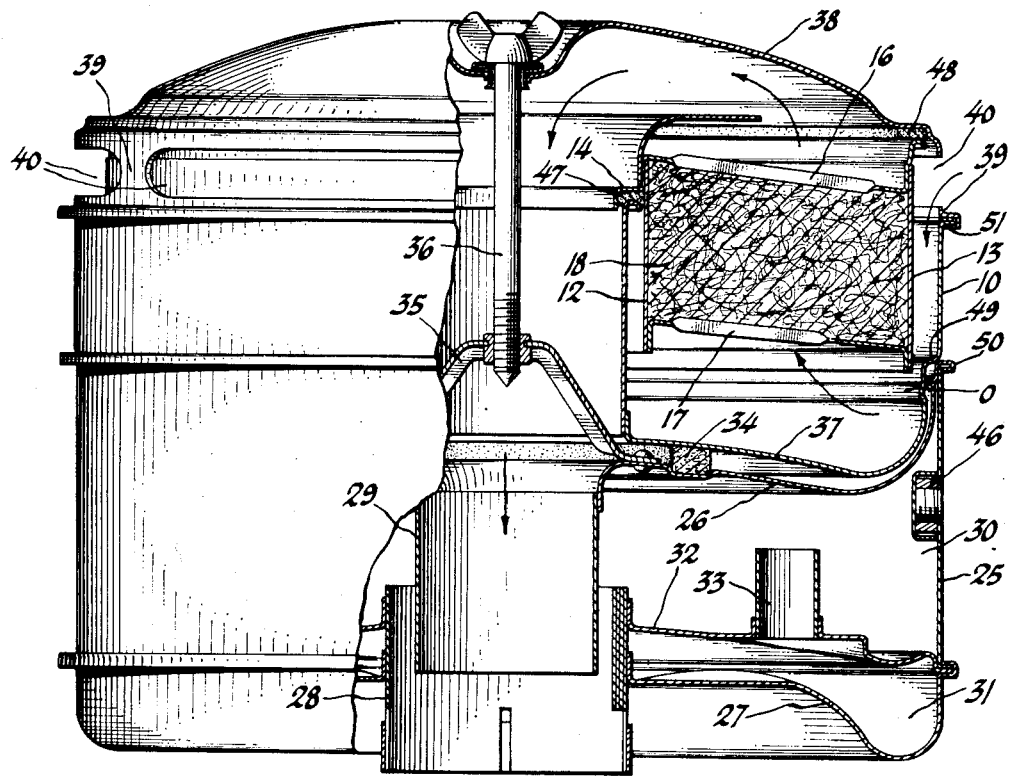
Figure 2 shows, partly in elevation and partly in section, a modified form of the air cleaner and silencer assembly shown in Figure 1.

The air cleaner and silencer assembly shown in Figure 2 does not differ materially from that shown in Figure 1 except in the shape of the bottom 37 of the air cleaner element, in that the flange 51 on the upper end of the outer wall of the cup-like member 10 of the air cleaner element is turned outwardly instead of inwardly, and in that the cover element 38 is a simple one-piece sheet metal element and has on its outer edge a downwardly extending flange 39 in which there are provided a number of air intake openings 40. When the wing screw 36 is tightened to the extent described, the gaskets 47 and 48 will be compressed sufficiently that the lower edge of the flange 39 will be seated on the flange 51 on the upper end of the outer wall of the cup-like member 10.

Figure 3:
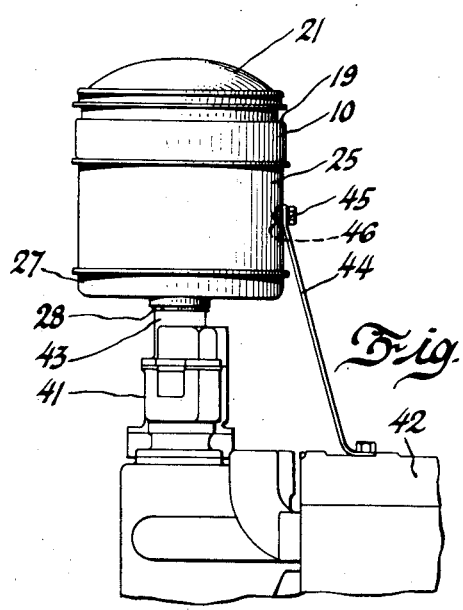
Figure 3 shows the air cleaner and silencer assembly shown in Figure 1 installed on an internal combustion engine.

The air cleaner and silencer assemblies shown in the drawings were designed for installation on downdraft carburetors of internal combustion engines as shown in Figure 3. In Figure 3, the air cleaner and silencer assembly shown in Figure 1 is mounted on the downdraft carburetor 41 of the engine 42 with the tube 28 of the silencer element connected to the air intake tube 43 of the carburetor. To steady the assembly, there is preferably provided a brace 44 which is connected at one end to the engine block and at its opposite end to the silencer element by means of a screw 45 and a nut 46 which is secured to the cylindrical wall 25 of the silencer element.

When one of the assemblies shown in Figures 1 and 2 is installed as described and shown in Figure 3 and the engine 42 is operating, the engine suction will draw air from the atmosphere into the opening 19 (or the openings 40) and through the air cleaner element, by the path indicated by the arrows, into the tube 12. In the course of its passage from the opening 19 (or the openings 40) to the tube 12 the air will be freed of foreign matter. From the tube 12 the air passes through the duct 28—29 of the silencer element to the carburetor and cylinders of the engine. It will, of course, be understood that the silencer element, which will be recognized as one of the resonator type, will be so tuned as set forth in the Wilson application Serial No. 470,700, filed July 25, 1930, that it will (in conjunction with the sound absorbing material in the cover 21 in the case of the assembly shown in Figure 1) eliminate the so-called "intake noises" of the engine. It should, however, be pointed out that the air cleaner element, itself, functions to some extent as a silencer and, moreover, by providing acoustic resistance on the atmospheric side of the silencer element, increases the silencing efficiency of the latter. Consequently, in an assembly of the type under consideration a silencer element which is smaller and, by itself, less efficient than that which would be required if the air cleaner element were not present may be satisfactorily employed.

It will, of course, be apparent that, when the wing screw 36 of either of the illustrated assemblies is unfastened, the silencer and air cleaner elements and the body, filter and cover elements of the air cleaner can be separated from each other. This characteristic, of course, facilitates cleaning of the air cleaner element.

I claim:

1. In an air cleaner and silencer assembly, a silencer in which there is included a drum-like body with an air inlet orifice in its upper head, an air cleaner in which there is included a cup-shaped body with an air outlet orifice in its bottom seated on the upper head of the drum-like body with the orifice in its bottom alined with the orifice in the upper head of the drum-like body, a tubular member which encircles the orifice in the bottom of the cup-shaped body and constitutes a duct through which air is conducted from the air cleaner into the orifice in the upper head of the drum-like body and with the cup-shaped body constitutes an annular liquid reservoir, an annular filter element which is disposed between the tubular member and the side wall of the cup-shaped body, a cover for the filter element and the end of the tubular member, an annular sealing gasket which is interposed between the bottom of the cup-shaped body and the upper head of the drum-like body and encircles the orifices therein, means for securing the air cleaner to the silencer so as to compress the gasket and bring the bottom of the cup-shaped body and the upper head of the drum-like body into contact at a distance from the annular gasket and effectively prevent the passage of air into the air inlet orifice in the upper head of the silencer between the bottom of the cup-shaped body and the upper head of the drum-like body, and orifices through which air is admitted into the air cleaner and withdrawn from the silencer.

2. In an air cleaning and silencing device, a generally vertically disposed generally cylindrical shell which constitutes an element of a silencer, a generally vertically disposed generally cup-shaped member which covers the upper end of the shell and is mounted on it at its periphery with its bottom nested within the upper end thereof secured to the shell, a generally tubular member which constitutes a duct through which air is conducted from the generally cup-shaped member into the generally cylindrical shell and with the generally cup-shaped member defines the annular liquid reservoir of an air cleaner, and orifices through which air is admitted into the generally cup-shaped member and withdrawn from the shell.

3. In an air cleaner and silencer assembly, a silencer which includes a generally vertically disposed tubular member which constitutes a duct through which air and sound waves travel, a side wall which encircles the duct, and a lower end wall and a concave upper end wall which with the tubular member and the side wall define a sound wave attenuating compartment which constitutes a side branch of the duct; an air cleaner which includes a generally cup-shaped member secured to the silencer with its bottom nested within the concave upper end wall thereof, and a generally tubular member which constitutes a duct through which air is conducted from the air cleaner into and is approximately alined with the duct of the silencer and with the generally cup-shaped member constitutes an annular liquid reservoir; and an orifice through which air is admitted into the air cleaner.

4. In an air cleaner and silencer assembly, a silencer which includes a generally vertically disposed drum-like member with an orifice in its upper head; an air cleaner which includes a generally cup-shaped member secured to the silencer with its bottom in contact with the upper end of the drum-like body near the orifice in its upper head and its periphery, and a generally tubular member which constitutes a duct through which air is conducted from the air cleaner into and is approximately alined with the orifice in the upper head of the drum-like member and with the generally cup-shaped member constitutes an annular liquid reservoir; and orifices through which air is admitted into the air cleaner and withdrawn from the silencer.

5. In an air cleaner and silencer assembly, a silencer which includes a generally vertically disposed drum-like member with an orifice in its upper head; an air cleaner which includes a generally cup-shaped member seated on the upper end of the silencer, and a generally tubular member which constitutes a duct through which air is conducted from the air cleaner into and is approximately alined with the orifice in the upper head of the drum-like member and with the generally cup-like member constitutes an annular liquid reservoir; an annular sealing gasket which is interposed between the bottom of the generally cup-like member and the upper head of the drum-like member near the axis of the assembly and encircles the orifices in the bottom of the generally cup-like member and the upper head of the drum-like member, and means for securing the air cleaner to the silencer so as to compress the gasket and effectively prevent the passage of air into the orifice in the upper head of the drum-like member between the bottom of the generally cup-shaped member and the upper head of the drum-like member; and orifices through which air is admitted into the air cleaner and withdrawn from the silencer.

6. In an air cleaner and silencer assembly, a silencer which includes a tubular member which constitutes a duct through which air and sound waves travel, a side wall which encircles the duct, and end walls which with the tubular member and the side wall define a sound wave attenuating compartment which constitutes a side branch of the duct; an air cleaner which includes a generally cup-shaped member seated on the upper end wall of the silencer, and a generally tubular member which constitutes a duct through which air is conducted from the air cleaner into and is approximately alined with the orifice in the upper end wall of the silencer and with the generally cup-shaped member constitutes an annular liquid reservoir; an annular sealing gasket which is interposed between the bottom of the generally cup-shaped member and the upper end wall of the silencer near the axis of the assembly and encircles the orifices in the bottom of the generally cup-shaped member and the upper end wall of the silencer, and means for securing the air cleaner to the silencer so as to compress the gasket and draw the bottom of the cup-shaped member and the upper end of the silencer into contact near the periphery of the assembly and effectively prevent the passage of air into the tubular member of the silencer between the bottom of the generally cup-shapd member and the upper end wall of the silencer; and an orifice through which air is admitted into the air cleaner.

7. In an air cleaner and silencer assembly, a silencer which includes a generally vertically disposed drum-like member with a concave upper head with an air intake orifice in it; an air cleaner which includes a generally cup-shaped member and a generally tubular member which constitutes the air outlet duct of the air cleaner and with the generally cup-shaped member constitutes an annular liquid reservoir mounted on the upper end of the silencer with the generally tubular member approximately alined with the air intake orifice in the upper head of the silencer and its bottom nested within the concave upper head of the silencer, an annular sealing gasket which is interposed between the bottom of the generally cup-shaped member and the upper head of the drum-like member and encircles the air discharge orifice in the former and the air intake orifice in the latter, means for securing the air cleaner to the silencer and compressing the gasket so as effectively to prevent passage of air into the air intake orifice in the upper head of the silencer between the bottom of the generally cup-shaped member and the top of the drum-like member, and orifices through which air is admitted into the air cleaner and withdrawn from the silencer.

8. In an air cleaner and silencer assembly, a silencer which includes a generally vertically disposed drum-like member with a concave upper head with an air intake orifice in it; an air cleaner which includes a generally cup-shaped member and a generally tubular member which constitutes the air outlet duct of the air cleaner and with the generally cup-shaped member constitutes an annular liquid reservoir mounted on the upper end of the silencer with the generally tubular member approximately alined with the air intake orifice in the upper head of the silencer and its bottom nested within the concave upper head of the silencer; an annular sealing gasket which is interposed between the bottom of the generally cup-shaped member and the upper head of the drum-like member near the axis of the assembly and encircles the air discharge orifice in the former and the air intake orifice in the latter, means for securing the air cleaner to the silencer and compressing the gasket so as effectively to prevent passage of air into the air intake orifice in the upper head of the silencer between the bottom of the generally cup-shaped member and the top of the drum-like member and to draw the bottom of the generally cup-shaped member into contact with the upper end of the silencer near the periphery of the assembly, and orifices through which air is admitted into the air cleaner and withdrawn from the silencer.

HERBERT G. KAMRATH.